(12) United States Patent
Egger et al.

(10) Patent No.: US 11,562,281 B2
(45) Date of Patent: Jan. 24, 2023

(54) HIERARCHICAL PORTFOLIO OPTIMIZATION USING CLUSTERING AND NEAR-TERM QUANTUM COMPUTERS

(71) Applicant: International Business Machines Corporation, Armonk, NY (US)

(72) Inventors: Daniel Josef Egger, Zürich (CH); Stefan Woerner, Zürich (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 521 days.

(21) Appl. No.: 16/669,700

(22) Filed: Oct. 31, 2019

(65) Prior Publication Data
US 2021/0133881 A1  May 6, 2021

(51) Int. Cl.
*G06N 10/00* (2022.01)
*G06F 17/11* (2006.01)
*G06F 17/16* (2006.01)

(52) U.S. Cl.
CPC ............ *G06N 10/00* (2019.01); *G06F 17/11* (2013.01); *G06F 17/16* (2013.01)

(58) Field of Classification Search
CPC ................................ G06N 10/00; G06F 17/11
See application file for complete search history.

(56) References Cited

U.S. PATENT DOCUMENTS

| | | | |
|---|---|---|---|
| 2003/0195831 A1* | 10/2003 | Feldman | G06Q 40/06 705/36 R |
| 2013/0117200 A1 | 5/2013 | Thom | |
| 2017/0323206 A1 | 11/2017 | Khayer et al. | |
| 2017/0372427 A1 | 12/2017 | Johnson et al. | |
| 2021/0216897 A1* | 7/2021 | Woerner | G06F 17/18 |

OTHER PUBLICATIONS

Zakaria Marakbi; Mean-Variance Portfolio Optimization: Challenging the role of traditional covariance estimation; Master of Science Thesis; Stockholm, Sweden 2016 (Year: 2016).*
Fernandez et al., "Portfolio selection using neural networks," arXiv:cs/0501005 [cs.NE], Jan. 3, 2005, 12 pages.
Woerner et al., "Qiskit Finance: Portfolio Optimization," https://github.com/Qiskit/qiskit-iqx-tutorials/blob/master/qiskit/advanced/aqua/finance/optimization/ portfolio_optimization.ipynb, 8 pages, last accessed Oct. 2, 2019.

(Continued)

*Primary Examiner* — Joseph D Torres
(74) *Attorney, Agent, or Firm* — Amin, Turocy & Watson, LLP

(57) ABSTRACT

Systems and methods that address an optimized method to handle portfolio constraints such as integer budget constraints and solve portfolio optimization problems that map both to mixed binary and quadratic binary optimization problems. A digital processor is used to create a hierarchical clustering; this clustering is leveraged to allocate capital to sub-clusters of the hierarchy. Once the sub-clusters are sufficiently small, a quantum processor is used to solve the portfolio optimization problem. Thus, the innovation employs clustering to reduce an optimization problem to sub-problems that are sufficiently small enough to be solved using a quantum computer given available qubits.

18 Claims, 14 Drawing Sheets

(56) References Cited

OTHER PUBLICATIONS

Barkoutsos et al., "Improving Variational Quantum Optimization using CVaR," arXiv:1907.04769v1 [quant-ph], Jul. 10, 2019, 11 pages.
Simonetto et al., "Qiskit Finance: Portfolio diversification," https://github.com/Qiskit/qiskit-iqx-tutorials/blob/master/qiskit/advanced/aqua/finance/optimization/portfolio_diversification.ipynb, 13 pages, last accessed Oct. 2, 2019.
Venturelli et al., "Reverse Quantum Annealing Approach to Portfolio Optimization Problems," arXiv:1810.08584 [quant-ph], Oct. 25, 2018, 19 pages.
Elsokkary et al., "Financial Portfolio Management using D-Wave's Quantum Optimizer: The Case of Abu Dhabi Securities Exchange," 2017 IEEE High Performance Extreme Computing Conference (HPEC '17) Twenty-first Annual HPEC Conference, Sep. 1, 2017, 5 pages.
Rosenberg et al., "Solving the Optimal Trading Trajectory Problem Using a Quantum Annealer," arXiv:1508.06182v3 [q-fin.CP], Aug. 11, 2016, 13 pages.
Alipour et al., "Quantum-inspired hierarchical risk parity," 1QBit Information Technologies, 2016, 11 pages.
Farhi et al., "A Quantum Approximate Optimization Algorithm," arXiv:1411.4028 [quant-ph], Nov. 14, 2014, 16 pages.
Prado, "Building Diversified Portfolios that Outperform Out-of-Sample," Guggenheim Partners, Computational Research Division, Lawrence Berkeley National Laboratory, May 23, 2016, 31 pages.

\* cited by examiner

HIERARCHICAL PORTFOLIO OPTIMIZATION USING CLUSTERING AND NEAR-TERM QUANTUM COMPUTERS

TECHNICAL FIELD

The subject disclosure relates generally to a system and method that optimizes asset portfolios using hybrid classical-quantum algorithms when integer constraints are present or when assets can only be bought and sold in odd lots, and support a constraint where quantum computers have limited number of qubits.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that facilitate hybrid classical-quantum algorithm to optimize large portfolios when integer constraints are present or when assets can only be bought and sold in odd lots.

In accordance to an embodiment, a system, comprises: a memory that stores computer-executable components; a processor, operably coupled to the memory, and that executes the computer-executable components stored in the memory, wherein the computer executable components comprise: an analyzer component that analyzes an investment universe where integer constraints are present or when assets can only be bought and sold in odd lots; a clustering component that performs hierarchical clustering on M number of assets of the universe to generate sub-clusters of aggregated subsets of the assets; an allocation component that performs a recursive capital allocation to the sub-clusters until the sub-clusters (Ci) are small enough that the capital allocation of said sub-clusters can be executed by a quantum processor; a transmission component that transmits the sub-clusters to the quantum processor for solving an optimization problem associated with the respective M number of assets; and a presentation component that receives from the Quantum processor respective solutions for each of the Ci sub- Page 2 of 37 P201906129US01 clusters and presents a set of optimized solutions.

In accordance with an embodiment, a computer implemented method, comprises: using a processor to execute computer executable components stored in memory to perform the following acts: analyze an investment universe where integer constraints are present or when assets can only be bought and sold in odd lots; perform hierarchical clustering on M number of assets of the universe to generate sub-clusters of aggregated subsets of the assets; perform a recursive capital allocation to the sub-clusters until the sub-clusters ($C_i$) are small enough that the capital allocation of said sub-clusters is executable by a quantum processor; transmit the $C_i$ sub-clusters to the quantum processor for solving an optimization problem associated with the respective M number of assets; and receive from the quantum processor respective solutions for each of the $C_i$ sub-clusters and presents a set of optimized solutions.

In accordance with another embodiment, a system comprises a memory that stores computer executable components; and a quantum processor that executes the following computer executable components: a receiving component that receives from a classical computer a set of sub-clusters (Ci), of aggregated subsets of M number of assets of an investment universe where integer constraints are present or when assets can only be bought and sold in odd lots, wherein the size of Ci is equal to or below a threshold executable by the quantum processor; a computing component that performs a binary/mixed-integer mean-variance optimization on each subcluster; and a transmission component that transmits to the classical computer optimized solutions for asset allocation for respective sub-clusters (Ci).

In accordance with yet another embodiment, a computer-implemented method comprises using a quantum processor to execute computer executable components stored in memory to perform the following acts: using the quantum processor to receive from a classical computer a set of sub-clusters (Ci), of aggregated subsets of M number of assets of an investment universe where integer constraints are present or when assets can only be bought and sold in odd lots, wherein the size of Ci is equal to or below a threshold executable by the quantum processor; performing, using the quantum processor, a binary/mixed-integer mean-variance optimization on each sub-cluster; and transmitting, using the quantum processor, to the classical computer optimized solutions for asset allocation for respective sub-clusters (Ci).

DETAILED DESCRIPTION

Figure 1:
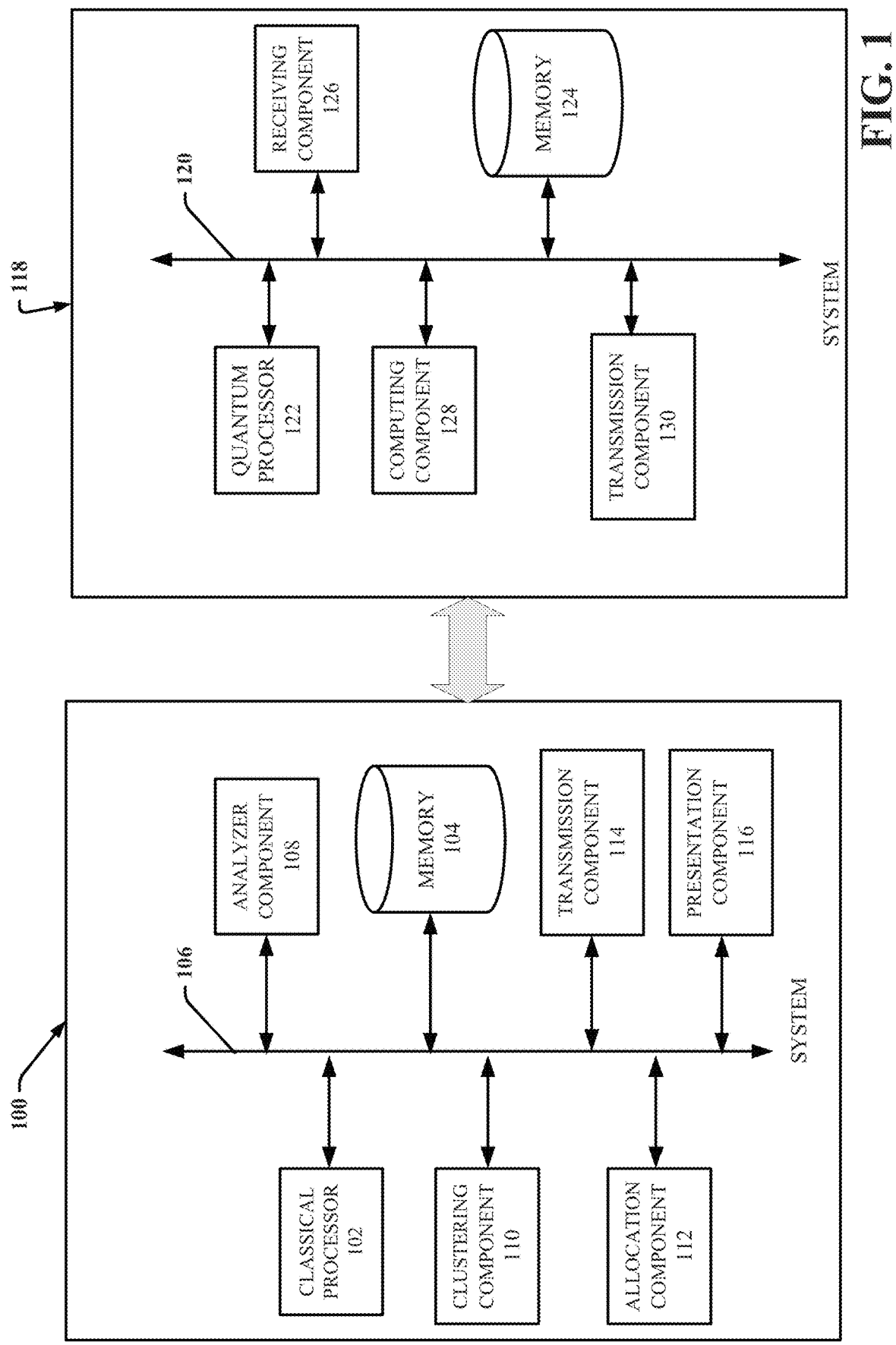
FIG. 1 illustrates a block diagram of an example system implemented that can function as Hierarchical portfolio optimization using clustering and near-term quantum computers.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

In today's digital world, data plays a prime factor in many applications. Action(s) taken by a user can often leave a digital footprint through satellite images, bio-medical field, smartphones, social media and other applications. Rapidly growing technology has led to exponential increase of machine-generated data. Big Data represents a new era in data exploration and utilization such that it consists of data that is high in volume, variety and velocity. Modern advances in software engineering have led to deploying software as services (known as SaaS), which provides an important advantage for organizations to focus on core businesses instead of expanding resources on computer infrastructure and maintenance. For example, a 'big-data' clustering software as a service, which takes a set of data instances as input, performs computations for data clustering and returns partitioning of the data to a client as an output. Big data can be used in many scenarios for data mining such as, to track user generated content in social media, analyze web page images from the web and census data, obtain required data from Internet of Things (IoT) sensors, activity tracking from smartphones and network traffic data for cyber-security. One such technique known as Vector Quantization assists to manage data and provide data mining results for statistical analysis.

Vector Quantization is a system that maps a sequence of continuous or discrete vectors (known as data sets) into digital sequence so that it is suitable for communication. Vector Quantization is mainly used for data compression wherein bit rates are reduced to minimize communication channel capacity or digital storage memory requirements while maintaining data integrity. Some common examples of Vector Quantization include medical/satellite image storage and transmission of audio signals through old noisy radio mobile communication channels. Vector Quantization helps to segregate large set of data sets into groups that have similar set of data points. Each group would be segregated by its common point based on various machine learning algorithms which are categorized into supervised and unsupervised algorithms. Majority of the machines use supervised learning algorithm that process input and output values and use an algorithm to map the input and output values accordingly. On the contrary, unsupervised algorithms have a set of input values and no corresponding output values. The main objective of an unsupervised learning algorithm is to understand the algorithm and ultimately compute an interesting structure to the data. One such algorithm classified as unsupervised is Clustering.

Clustering is a process of classifying data samples based on observations or patterns and distinguishing data points (also known as vectors) into disjoint groups (known as clusters). Each group contains objects with similar profiles and attributes. The data classification often requires a machine learning algorithm to measure distance or similarity between data sets. These algorithms are widely used across retail, banking, manufacturing, healthcare and other industries to help organize unstructured data. Many businesses use such algorithms to segregate customers data based on similar characteristics of the data. One of such industry is healthcare, where a hospital might cluster patients based on tumor size, for example, such that patients with different tumor sizes can be treated differently. Some common uses of clustering are to cluster customers based on purchase history, cluster documents based on similar words or cluster DNA sequences based on edit distance. Machine learning algorithms use various types of clustering techniques to differentiate similarity or dissimilarity of data sets.

Clustering algorithms are widely used in data mining and machine learning applications to analyze data in an organized manner and structure according to their data patterns. There are many types of clustering algorithms such as K-means, fuzzy c-means, Hierarchical clustering and many more. These clustering techniques use distance measures to group data to corresponding families. Clustering is a very useful tool for big data management and helps discover patterns within data in an unsupervised manner. Among many clustering algorithms, Hierarchical clustering algorithm is widely utilized in the market.

As big data becomes very advent in data analytics, the demand for data sampling and data dimension features are rapidly growing. Moreover, the desire to enable fast and efficient clustering of unlabeled samples is highly desirable. Thus, as a fundamental primitive, the Hierarchical clustering algorithm is receiving more and more attention today. Hierarchical clustering algorithms are classical clustering algorithms where sets of clusters are created. In this algorithm, clusters are compared with one another based on their similarity and clusters are combined accordingly. Thus, this clustering algorithm is based on the concept of grouping data objects into a hierarchy of tree of clusters. There are two fundamental types of hierarchical clustering analysis, Agglomerative and Divisive. Agglomerative Hierarchical clustering is based on bottom-up merging and Divisive Hierarchical clustering algorithm is based on top-down splitting. In Agglomerative clustering, each object is its own initial cluster at the beginning and at each iteration, pairs of clusters are merged based on their similarities as the clusters move up the hierarchy. This merging continues until many objects are in the same cluster. In Divisive approach, many objects start in one cluster. Then each object is split into multiple clusters recursively as it moves down the hierarchy. Through this way, each object forms its own cluster until many clusters only contain one object respectively. Hence, clustering algorithms are important as they assist to break large problems into smaller sub-problems.

Quantum computing is generally the use of Quantum-mechanical phenomena for the purpose of performing computing and information processing functions. Quantum computing can be viewed in contrast to classical computing, which generally operates on binary values with transistors. That is, while classical computers can operate on bit values that are either 0 or 1, Quantum computers operate on Quantum bits that comprise superpositions of both 0 and 1, can entangle multiple Quantum bits, and use interference. Superconducting qubits offer a promising path toward constructing fully-operational Quantum computers as it can exhibit Quantum-mechanical behavior (allowing to be used for Quantum information processing) at the macroscopic level (allowing to be designed and fabricated by existing integrated circuit technologies). A Quantum computation uses the Qubit as its fundamental unit instead of the classical computing bit. The qubit (e.g., quantum binary digit) is the quantum-mechanical analogue of the classical bit. Whereas classical bits can take on only one of two basis states (e.g., 0 or 1), qubits can take on superpositions of those basis states (e.g., $\alpha|0\rangle+\beta|1\rangle$, where $\alpha$ and $\beta$ are complex scalars such that $|\alpha|^2+|\beta|^2=1$), allowing a number of qubits to theoretically hold exponentially more information than the same number of classical bits. Thus, quantum computers (e.g., computers that employ qubits instead of solely classical bits) can, in theory, quickly solve problems that would be extremely difficult for classical computers. The bits of a classical computer are just binary digits, with a value of either 0 or 1. Almost any device with two distinct states can serve to represent a classical bit: a switch, a valve, a magnet, a coin. Qubits, partaking of the quantum mystique, can occupy a superposition of 0 and 1 states. It's not that the qubit can have an intermediate value, such as 0.63; when the state of the qubit is measured, the result is always 0 or 1. But in the course of a computation a qubit can act as if it were a mixture of states—say, 63 percent 0 and 37 percent 1.

By processing information using the laws of Quantum mechanics, Quantum computers offer novel ways to perform computation tasks such as molecular calculations, financial risk calculations, optimization and many more. For instance, in an investment universe, there are a large set of assets wherein subsets of these assets need to be identified based on budget constraints such that an optimal process is used to identify viable assets that can be purchased to meet the profit margin. The optimal process is calculated based on methods such as mean-variance which is a process of weighing risk, expressed as variance against expected return. However, when the problem comes down to using Quantum computing or Quantum optimization in the investment universe, a 1-1 mapping is used between number of assets and the number of qubits required in a Quantum computer. Also, one asset could be represented by more than one qubit. In reality, if the number of assets is 1000 or more and the number of qubits is approximately 50 then this optimization mapping currently would not work to identify the best portfolio in the investment universe using the current Quantum computers. Moreover, mixed integer binary optimization is a hard problem in Quantum computers. Mixed integer binary optimization depicts the combination of real-values (can take fractions) and integer values. While it is not believed that quantum computers may solve hard problems, it can offer heuristics to find near optimal solutions. Such heuristics include the Variational Quantum Eigensolver (VQE) algorithm and the Quantum Approximate Optimization Algorithm (QAOA). Many business relevant problems are too large to be tackled using the noisy intermediate scale Quantum computers that may be available in the near future. However, many computational tasks can be broken down into smaller optimization instances. For instance, computational tasks that are amendable to a divide and conquer approach may benefit from noisy intermediate scale quantum (NISQ) computers. Computational tasks that can be broken down into smaller instances using other approaches may thus also benefit from quantum computing. Portfolios of financial assets are often constructed by trading-off risk for return while taking into account external constraints. This mean-variance optimization problem can become hard when the assets can only be traded in odd-lots or when certain constraints, such as integer budget constraints, are introduced. As an example, consider the hedge fund space where hedge fund managers only let clients invest if the clients bring a minimum amount of capital. A fund-of-fund asset manager may wish to invest only in a subset of hedge fund managers for his new fund-of-funds investment vehicle. The asset manager is thus faced with a binary decision problem: choose N hedge fund managers out of M>N. The asset manager may invest K$ with each chosen hedge fund manager. The asset manager may maximize his expected return, minimize his risk and fully invest his budget B=NK$. Quantum computers may be better suited at dealing with binary/mixed-integer optimization problems than classical computers. However, near term Quantum computers may not have enough qubits to represent the typical number of assets considered when optimizing a portfolio. Thus, these embodiments show how to perform portfolio optimization with a hybrid Quantum/classical algorithm on limited size Quantum computers and address budget constraints when using the Quantum processor to optimize the asset allocation to the clusters.

In these embodiments, a hybrid classical-quantum algorithm is used to optimize large portfolios when integer constraints are present or when assets can only be bought and sold in odd lots. This method is designed to work for any Quantum computer but its design was specifically guided by the constraint that near-term Quantum computers only have a limited number of qubits. These embodiments can be used to solve portfolio optimization problems that map both to mixed binary optimization problems and quadratic binary optimization problems. Given an investment universe with M potential investments, a total budget B, and a Quantum computer with $N_q$ qubits (for instance $N_q<M$), first the optimization problem is decomposed into smaller instances using a classical Hierarchical clustering on a classical computer. Next, a recursive capital allocation to the sub-clusters is performed. This may be done either on a Quantum computer by aggregating the assets in the clusters or on a classical computer. Upon capital allocation, Quantum computer such as gate-based Quantum computer can be used to optimize these sub-clusters. This task can be performed by a binary/mixed-integer mean-variance optimization method on each sub-cluster using a gate-based Quantum computer via a VQE/QAOA algorithms. Other algorithms that are best suited for the data set optimization can also be used accordingly. These embodiments mainly focus to solve the problem wherein modern portfolio optimization instances are too large to fit on near-term NISQ computers (Noisy Intermedia Scale Quantum). A significant part of this embodiment is the usage of clustering to reduce the optimization problem to sub-problems small enough to be dealt with using gate-based Quantum computers.

FIG. 1 illustrates a block diagram of example systems 100 and 118 implemented that can access data and process that data using variable computing components depicted in accordance with one or more embodiments described herein. System 100 represents a client-side system that employs classical computing techniques, and system 118 represents a host system that employs quantum computing techniques. System 100 decomposes an asset allocation problem to a level that can be rapidly processed by system 118 as a function of available quantum bits. Systems 100 and 118 can facilitate a process of assessing and identifying a large amount of various forms of data, and using machine learning, training a neural network or other type of model. The systems 100 and 118 can also generate predictive recommendations to an individual level resulting in a context in accordance with one or more embodiments described herein. Aspects of systems (e.g., system 100 and 118 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 and 118 can optionally include a server device, one or more networks and one or more devices (not shown). The system 100 can also include or otherwise be associated with at least one classical processor 102 that executes computer executable components stored in memory 104. The system 100 can further include a system bus 106 that can couple various components including, but not limited to, an analyzer component 108 that component that analyzes an investment universe where integer constraints are present or when assets can only be bought and sold in odd lots; a clustering component 110 that performs Hierarchical clustering on M number of assets of the universe to generate sub-clusters of aggregated subsets of the assets or by assigning a fraction of the budget to each sub-clusters; an allocation component 112 that performs a recursive capital allocation to the sub-clusters until the size of the sub-clusters ($C_i$) is equal to or below a threshold executable by a quantum processor; a transmission component 114 that transmit the $C_i$ sub-clusters to the quantum processor for solving on optimization problem associated with the respective M number of assets; and a presentation component 116 that receives from the quantum processor respective solutions for each of the $C_i$ sub-clusters and presents a set of optimized solutions.

System 100 and 118 can optionally include a server device, one or more networks and one or more devices (not shown). The system 100 can also include or otherwise be Page 10 of 37 P201906129US01 associated with at least one classical processor 102 that executes computer executable components stored in memory 104. The system 100 can further include a system bus 106 that can couple various components including, but not limited to, an analyzer component 108 that component that analyzes an investment universe where integer constraints are present or when assets can only be bought and sold in odd lots; a clustering component 110 that performs Hierarchical clustering on M number of assets of the universe to generate sub-clusters of aggregated subsets of the assets or by assigning a fraction of the budget to each sub-clusters; an allocation component 112 that performs a recursive capital allocation to the sub-clusters until the size of the sub-clusters (Ci) is equal to or below a threshold executable by a quantum processor; a transmission component 114 that transmits the Ci sub-clusters to the quantum processor for solving an optimization problem associated with the respective M number of assets; and a presentation component 116 that receives from the quantum processor respective solutions for each of the Ci sub-clusters and presents a set of optimized solutions.

The system 118 can also include or otherwise be associated with at least one Quantum processor 122 that executes computer executable components stored in memory 124. The system 118 can further include a system bus 120 that can couple various components including, but not limited to, a receiving component 126 that receives from a classical computer a set of sub-clusters (Ci), of aggregated subsets of M number of assets of an investment universe where integer constraints are present or when assets can only be bought and sold in odd lots, wherein Ci is equal to or below a threshold executable by the quantum processor; a computing component 128 that performs a binary/mixed-integer mean-variance optimization on each subcluster; and a transmission component 130 that transmits to the classical computer optimized solutions for asset allocation for respective sub-clusters (Ci).

In accordance with the system 100, a memory 104 can store computer executable components executable by the classical processor 102 on a classical computer. The system 118 includes a memory 124 can store computer executable components executable by the Quantum processor 122. As stated in the previous section, in order to perform portfolio optimization with hybrid Quantum/classical algorithm on limited size Quantum computers, Hierarchical clustering needs to be performed on a clustering component 110 after analyzing an investment universe, e.g., using analyzing component 108. Once, system 100 performs capital allocation, e.g., using allocation component 112, the sub-clusters are transmitted through transmission component 114 to the Quantum processor 122. The receiving component 126 receives the sub-clusters data from the classical computer of system 100. The computing component 128 of system 118 performs a binary/mixed-integer mean-variance optimization on each sub-cluster and transmits through transmission component 130 optimized solutions for asset allocation for respective sub-clusters to the classical computer. The presentation component 116 of system 100 presents a set of optimized solutions received from system 118.

The various components of systems 100 or 118 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It may be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

Figure 2:
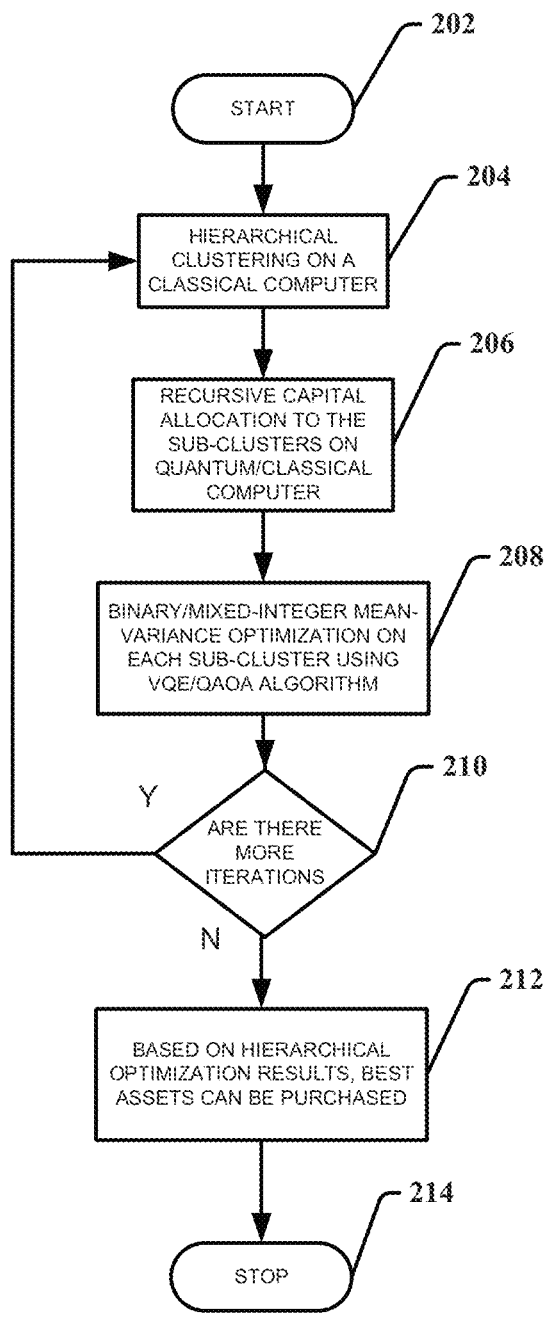
FIG. 2 illustrates a flow chart of a hybrid classical-quantum algorithm that facilitates optimizing asset portfolios.

FIG. 2 depicts a hybrid classical-quantum algorithm that can optimize asset portfolios when integer constraints are present or when assets can only be bought and sold in odd lots. In order for the design to work on a Quantum computer with limited number of qubits, the set of investible assets is decomposed into smaller components by Hierarchical clustering on a classical computer as denoted at 202 and 204. Upon clustering, recursive capital allocation as denoted at 206 is performed to the sub-clusters either by aggregating the assets in the clusters until the size of the sub-clusters is equal to or below a threshold size imposed by the Quantum or classical computer. For instance, assuming that $C_i$ is the set of clusters and if there are three sub-clusters $C_1$, $C_2$ and $C_3$, with M potential assets where M=6, assets 0, 4 and 5 could be in $C_1$ i.e. {0,4,5}. Similarly, assets 1 and 3 in $C_2$ i.e. {1,3} and asset 2 in $C_3$ i.e. {2}. The resulting smaller instances of the problem can be optimized at 208 on a gate-based Quantum computer by binary/mixed-integer mean-variance optimization on each sub-cluster using VQE/ QAOA algorithms. The number of iterations of this process can depend upon the number of sub-clusters in a problem. If there are more iterations, the process is repeated from block 204. If there are no more iterations then based on optimization results, the portfolio manager can evaluate and determine suitable assets that can be purchased as denoted at 212 and thus the process is completed at 214. The novelty of these embodiments is to solve the problem that modern portfolio optimization instances are too large to fit on near-term Noisy Intermedia Scale Quantum computers (NISQ computers). These embodiments address the budget constraints when using the Quantum processor to optimize the asset allocation to the clusters. Also, these embodiments address portfolio problems that correspond to a Mixed Binary and Quadratic Binary Optimization (e.g., optimization problems that feature both continuous and integer decision variables).

Figure 3:
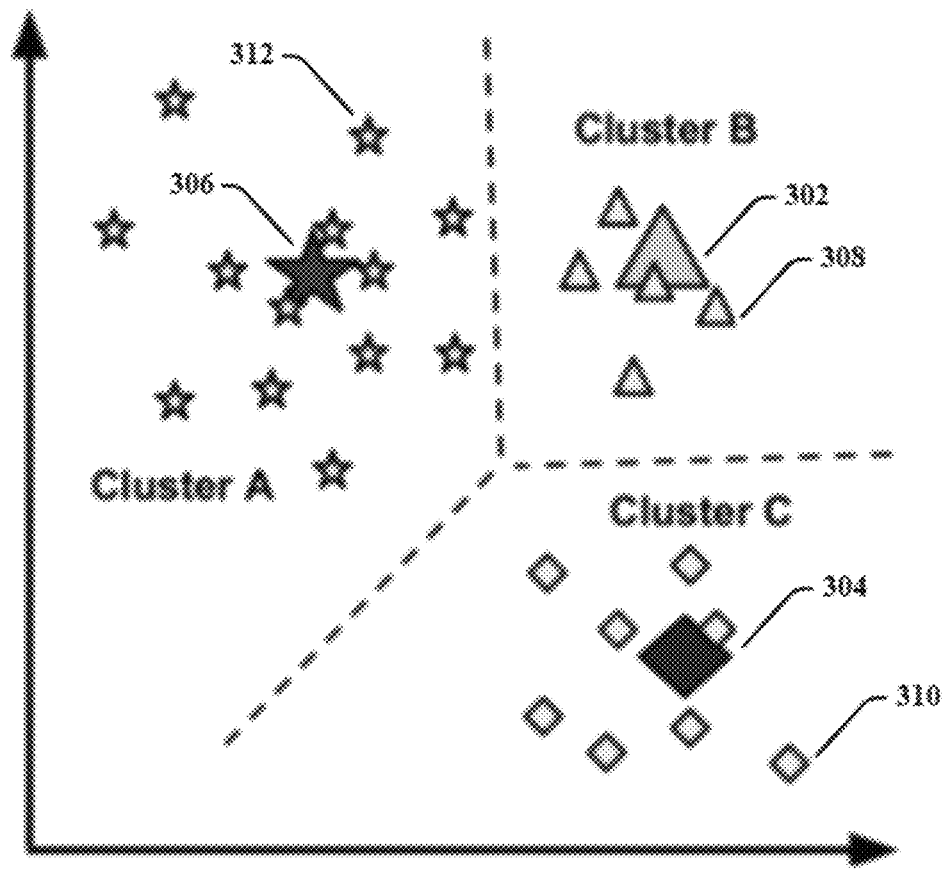
FIG. 3 illustrates clustering that can be applied to real-world applications which can be used by a clustering component.

FIG. 3 illustrates basics of clustering that can be applied to many real-world domains. Clustering can reduce large portfolio optimization instances into smaller sub-problems that can be optimized using NISQ computers. For instance, this figure is an illustration that can be used as sample data points for potential various tumor sizes that are shown as three uniquely identified clusters. This drawing can be a typical representation of various clustering algorithms and computation of centroids. The drawing illustrates three clusters namely cluster A, B and C identified in their respective axis. The sample data points in each cluster are labeled as block 308, 310 and 312 along with additional data points within each cluster area. The idea behind a clustering algorithm is to classify a given set of data points into k number of disjoint clusters such as A, B, and C as show in the illustration. The algorithm is executed in two phases: the first phase is to define centroids for each cluster and in this example the centroids are labelled at blocks 302, 304, 306. The next phase is to associate each data point to its corresponding nearest centroid such as blocks 308, 310, and 312. Thus, data points with similar characteristics can be grouped to their corresponding cluster. Many businesses use these algorithms to separate customers sharing similar characteristics. One of such industry is healthcare, as stated above, where the hospital might cluster patients based on their tumor size so that patients with different tumor sizes can be treated differently. This technique helps to organize unstructured data and it can be used in other areas such tabular data, images, text data as well.

Figure 4:
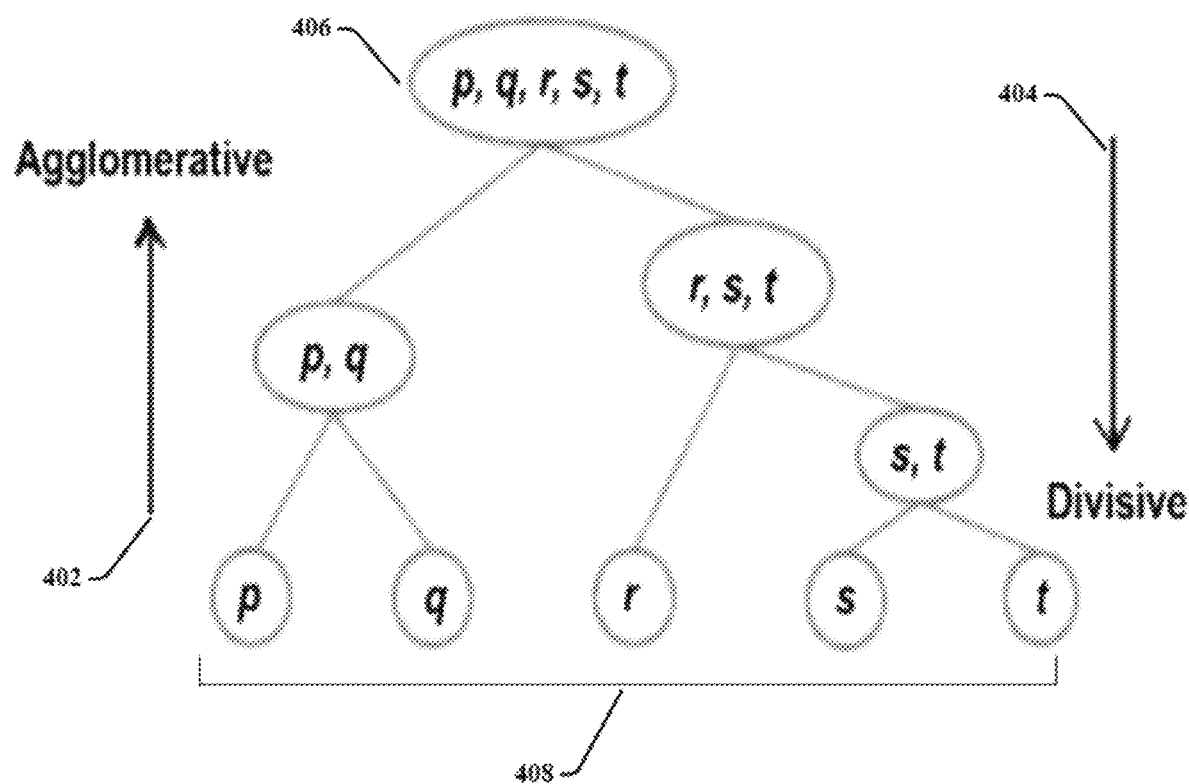
FIG. 4 illustrates a classical representation of two types of Hierarchical clustering, Agglomerative and Divisive algorithms.

FIG. 4 illustrates an example of the two types of Hierarchical clustering as mentioned above. Hierarchical clustering builds a cluster tree to represent data, where each node links to two or more successor groups. Eventually the groups are nested and organized as a tree, which ideally portrays as a meaningful classification scheme. Each node may contain a group of similar data such that clusters at one level may join with clusters in the next level up. This is a recursive process until every node is in the tree. In this figure, the two types of Hierarchical clustering algorithms, Agglomerative clustering method is denoted by 402 and Divisive clustering method is denoted by 404. For example, if there are 5 data points P, Q, R, S, T as denoted by 408, in Agglomerative method each data point is a single-point cluster. Two data points that have close distance proximity make one cluster as shown in FIG. 4, where (P,Q) forms one cluster, (S,T) forms one cluster and (R,S,T) forms one cluster. These steps are repeated until only one cluster is formed in the end (P,Q,R,S,T) as denoted by 406. In a Divisive method denoted at 404, which is the opposite of Agglomerative method, it follows a top-down clustering method where data points denoted at 406 are assigned to a single cluster and then the cluster is partitioned into a minimum number of non-similar clusters. This process is repeated recursively until there is one cluster for each observation as denoted by 408 where P, Q, R, S, T are individual clusters. Given an investment universe of N assets with return vector μ and covariance matrix Σ, an optimal portfolio to maximize the expected return can be constructed and minimize the risk by solving a problem of the form:

$$\max_x \mu^T x - q x^T \Sigma x$$

subject to given constraints. Here, the variable q controls the risk-return trade-off and $x_i$ is the weight allocated to asset i. This problem, with the budget constraint $\Sigma_i x_i = 1$, is efficiently solvable when the weights are continuous, e.g., $x_i \in \mathbb{R}$ $\forall_i$, since it is convex for positive semi-definite Σ. However, adding certain constraints, such as:

$$\sum_{i=1}^{N} z_i = K \text{ with } z_i \in \{0, 1\} \text{ and } \epsilon_i z_i \leq w_i \leq \delta_i z_i$$

which states invest in exactly K assets with $x_i \in [\epsilon i, \delta i]$, can transform the problem mentioned above into hard mixed binary optimization problem to solve. Furthermore, the portfolio optimization problem becomes a QUBO (Quadratic Unconstrained Binary Optimization) problem if the weights are restricted to integers $xi \in \{0, 1\}^{ki}$. This situation can arise when the assets can only be traded in odd lots. MBO and QUBO problems can be addressed using Quantum computers, for example, using the QAOA or the VQE algorithm. In these algorithms each asset is represented by one or several qubits. However, in practical cases, portfolios may feature thousands or more assets making it impossible to represent using the limited number of qubits that NISQ computers are expected to have. Solutions to efficiently solve portfolio optimization problems are found by inverting the correlation matrix Σ. This requires a non-singular estimation of Σ which is built from at least N(N−1)/2 independent and identically distributed return observations of the N assets. The time span of the required price time-series, thus, increases quadratically with the portfolio size. However, because correlations do not persist indefinitely, it may not be meaningful to gather return observations beyond a certain time-horizon. Additionally, a direct inversion of Σ tends to concentrate capital in a few assets and makes the weights highly sensitive to small changes in covariances. Therefore, it is desirable to decompose large problems into smaller sub-problems both from a financial perspective and to accommodate hardware constraints. In order to fit large portfolio optimizations on small NISQ computers, these embodiments propose to reduce the problem size by exploiting the Hierarchical structure of financial assets. Similar assets, such as the stock of similar companies in the same industry, are highly correlated.

Figure 5:
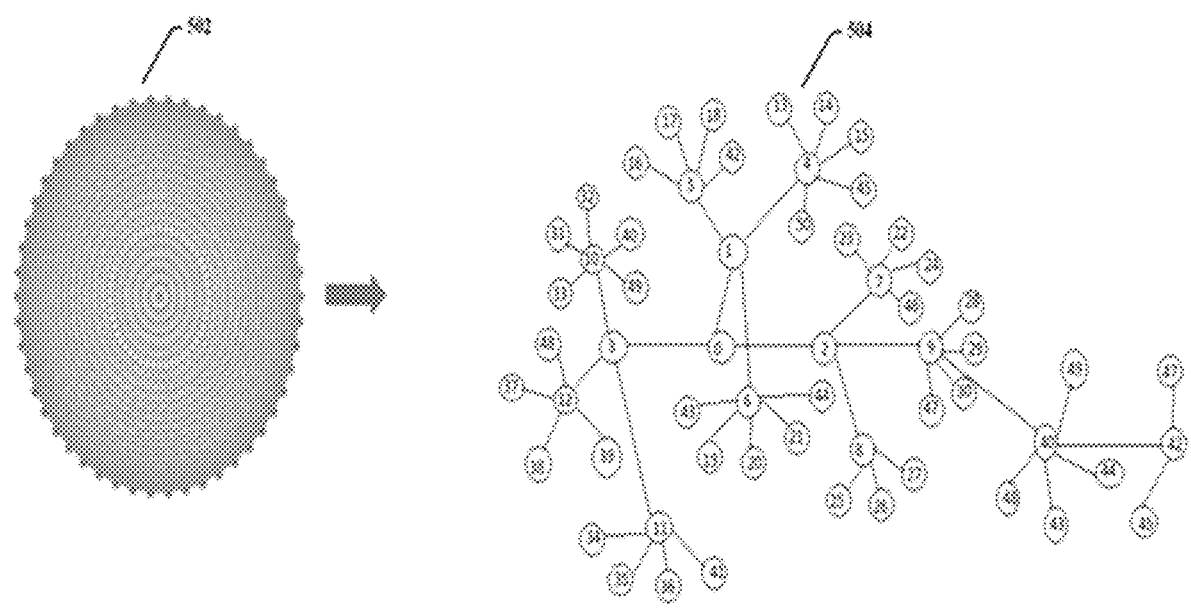
FIG. 5 illustrates an example of Hierarchical clustering of asset correlation matrix into a hierarchical cluster tree.

FIG. 5 illustrates an example of Hierarchical clustering, wherein a complete set of 50 asset correlation matrix is denoted by 502. A correlation matrix shows the correlation coefficients between sets of variables. Each random variable in a set is correlated with each other of the other values in a set. This allows to see which pairs have the highest correlation. The same group of assets in 502 can be clustered into 4 branches as shown in 504. The cluster in each branch can vary accordingly however the clusters cannot overlap in each branch in Hierarchical clustering. These embodiments use the correlation matrix p to construct a distance matrix d with entry i, j given by:

$$d_{i,j} = \sqrt{\frac{1}{2}(1 - \rho_{i,j})}.$$

Figure 6:
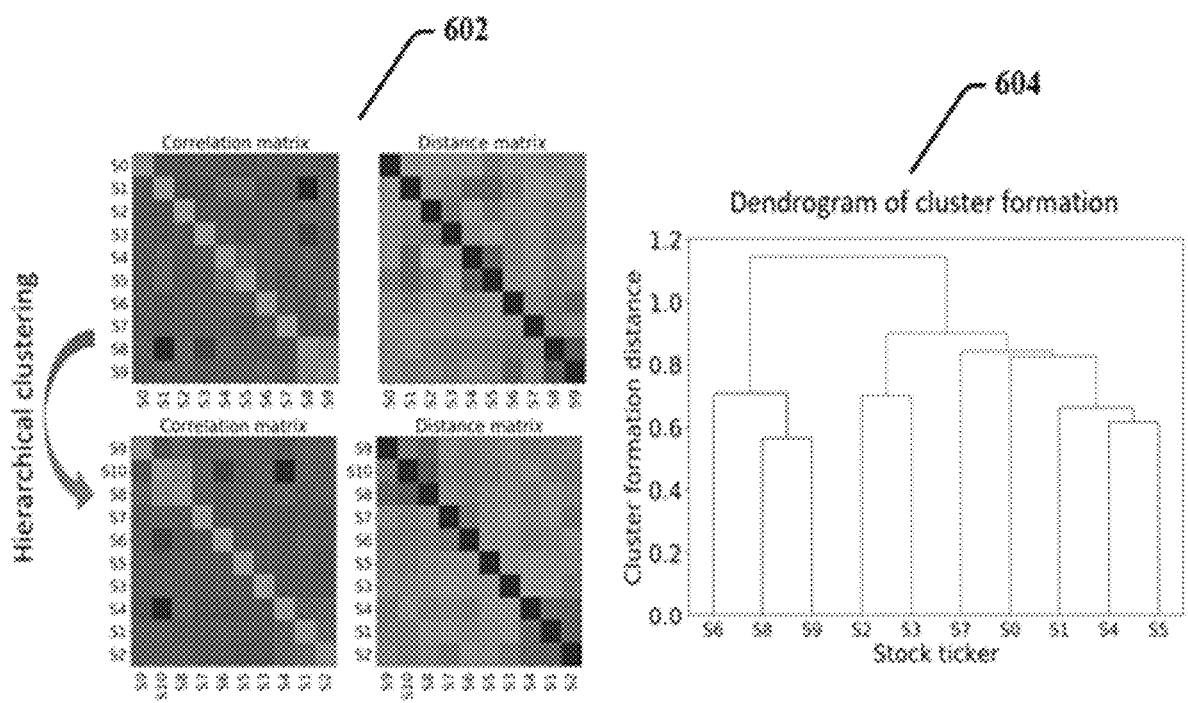
FIG. 6 illustrates a Hierarchical clustering correlation, distance matrix and its corresponding dendrogram of cluster formation.

The distance matrix can be used to construct a Hierarchical clustering of the assets, as exemplified by FIG. 6. A Hierarchical clustering can be represented as a dendrogram denoted by 604, i.e. a tree graph in which the leaves are the assets. The dendrogram in 604 illustrates the cluster formation in an investment universe of 10 stocks. In this case, stocks S2 and S3 are video gaming companies, stocks S6, S8 and S9 operate in the semiconductor industry and the remaining stocks S7, S0, S1, S4 and S5 are large technology companies. It can be seen that similar assets are placed together in 604. Reordering the assets in the correlation matrix following the in-order sorting of the leaves in the dendrogram arranges the correlation matrix into a quasi-block-diagonal form as denoted in 602. The block-diagonal correlation matrix can be leveraged to decompose the portfolio optimization problem into sub-problems. Indeed, when the covariance matrix is block-diagonal, e.g., $$\Sigma = \begin{pmatrix} \Sigma_1 & 0 \\ 0 & \Sigma_2 \end{pmatrix},$$

problem can be decomposed into sub-problems:

$$\begin{cases} \max_{x_1} \mu_1^T x_1 - q x_1^T \Sigma_1 x_1, \\ \max_{x_2} \mu_2^T x_2 - q x_2^T \Sigma_2 x_2. \end{cases}$$

Correlation matrix of the assets after reordering, follow the in-order sorting of the dendrogram's leaves is shown in 604. Hierarchical clustering may be used to reduce large portfolio optimization instances into smaller sub-problems that can be optimized using NISQ computers. However, care may be taken in preserving as best as possible the budget constraints.

Figure 7:
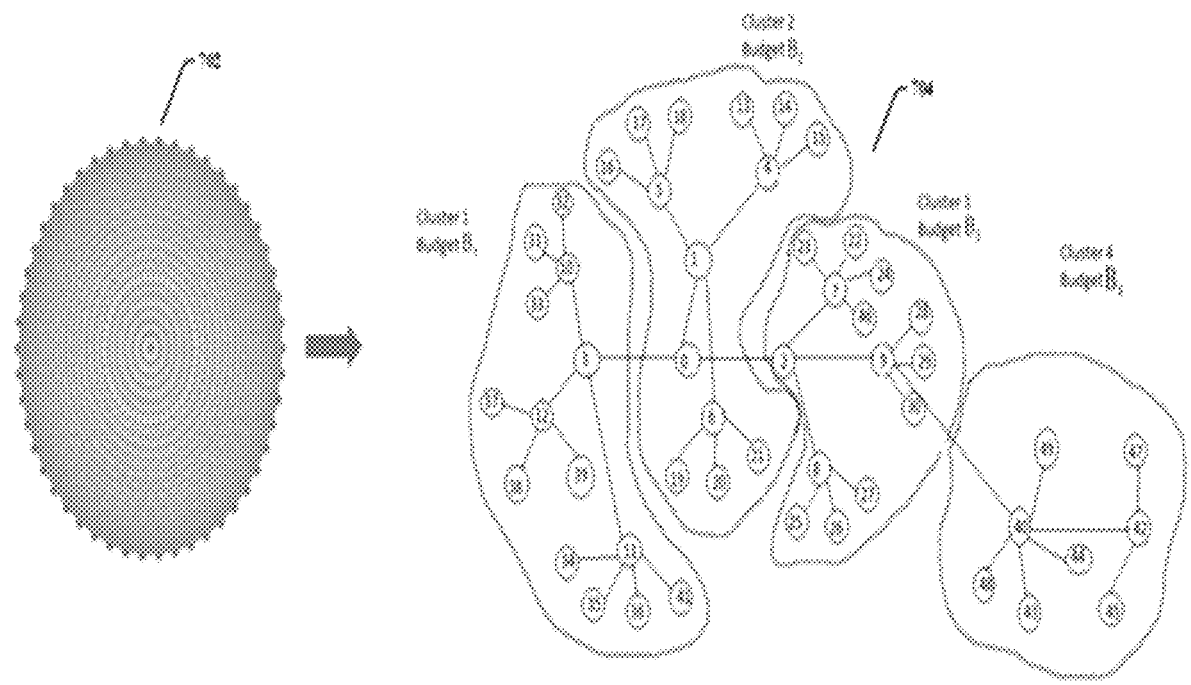
FIG. 7 illustrates an example of capital allocation of an asset correlation matrix into corresponding clusters and budget allocation.

FIG. 7 illustrates an example of capital allocation for a 50-asset correlation matrix. To preserve the budget constraints while using the Hierarchical clustering, methods were described above to decompose the portfolio optimization problem into smaller sub-problems. Upon clustering the 50-asset correlation matrix denoted by 702, capital allocation can be performed in which 4 clusters are formed with Budget $B_i$ allocated to each cluster. If clustering is performed for a computer with 14 qubits, each cluster can have assets less than or equal to 14 qubits as shown in 704. Clusters 1, 2, and 3 respectively have 14 assets and Cluster 4 has 8 assets accordingly. There are various methods to perform capital allocation and a portfolio manager may elect to allocate capital based on various methods. In these embodiments two of these methods are illustrated as method A and method B.

Method A is the inverse-variance capital allocation method. This can be demonstrated by an example for a QUBO problem capital allocation is performed within a cluster Cj with a budget constraint:

$$\sum_{x_i \in C_j} x_i = B_j.$$

The following discussion may also apply to budget constraints $\leq B_j$ and $\geq B_j$. In the inverse-variance capital allocation method, capital allocation is performed by descending down a binary clustering tree. A fraction $\alpha_j$ and $1-\alpha_j$ of the capital allocated to node j is allocated to the left and right sub-clusters of node j, respectively. This fraction is given by:

$$\alpha_j = 1 - \frac{\sigma_{j,1}}{\sigma_{j,1} + \sigma_{j,2}}$$

where $\sigma_{j,i} = w^T_i \Sigma_{j,i} w_i$ and the weights are:

$$w_i = (\mathrm{diag}\Sigma_{j,i})^{-1} \frac{1}{Tr[(\mathrm{diag}\Sigma_{j,i})^{-1}]}.$$

Here, $\Sigma_{j,i}$ is the covariance matrix of the i=1, 2 sub-clusters of $C_j$. Therefore, the budget constraint is split into two sub-budgets $B_{j,1} = \lfloor \alpha_j B_j \rfloor$ and $B_{j,2} = \lfloor (1-\alpha_j) B_j \rfloor$. The rounding is used to preserve the integer nature of the constraint. Therefore, the inaccuracies may arise each time an optimization problem is decomposed into two smaller sub-problems. For instance, the relation $B_{j,1} + B_{j,2} = B_j$ may not always hold. The rounding can be done by rounding-up and/or rounding-down. Here, the optimization problem is decomposed into instances small enough to fit on NISQ computers instead of breaking the problem down to the single asset level. Furthermore, larger NISQ computers may require less steps to break the initial problem down into sub-problems that fit onto the hardware, thus, resulting in lower inaccuracies.

Figure 8:
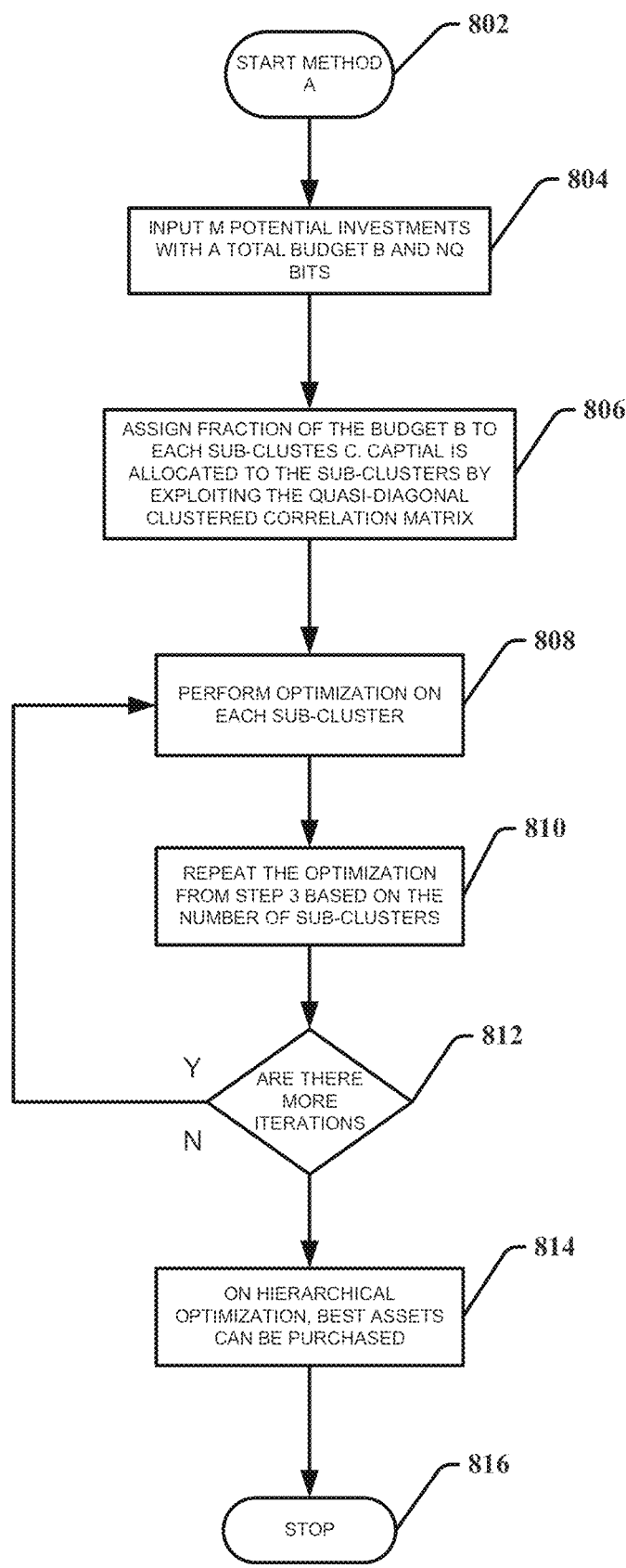
FIG. 8 illustrates a flow chart of a process to allocate capital allocation to sub-clusters.

FIG. 8 illustrates a flow chart of capital allocation to sub-clusters using method A. This can be denoted as a top down method starting at 802, in which with M potential investments, a total budget B and $N_q$ bits as denoted at 804. A fraction of the budget is assigned to each sub-cluster at 806. Capital is allocated to each sub-cluster by exploiting the quasi-diagonal cluster correlation matrix. Upon capital allocation, optimization is performed on each sub-cluster at 808. This process is repeated as denoted at 810, based on the number of sub-clusters. If there are more iterations at 812, then the process is repeated from 808 based on the number of sub-clusters available. If there are no more iterations, then based on the optimization results, the best subset of assets in each sub-cluster can be derived such that budget constraint is satisfied at 814 and this ends the process at 816. In this method, firstly the budget is assigned to each sub-cluster and then the problem is solved at a smaller level to decide which assets to buy within the cluster. For example, if there are 50 qubits and 10 clusters with at most 50 assets, then every cluster has optimization run individually such that for every cluster C, 30% of the overall budget is used. Through this way, for every cluster a detailed result is obtained which identifies which assets to purchase. This method is run 10 times to achieve an overall result. It is to be noted that budget allocation for the cluster in this method needs to be chosen wisely.

Figure 9:
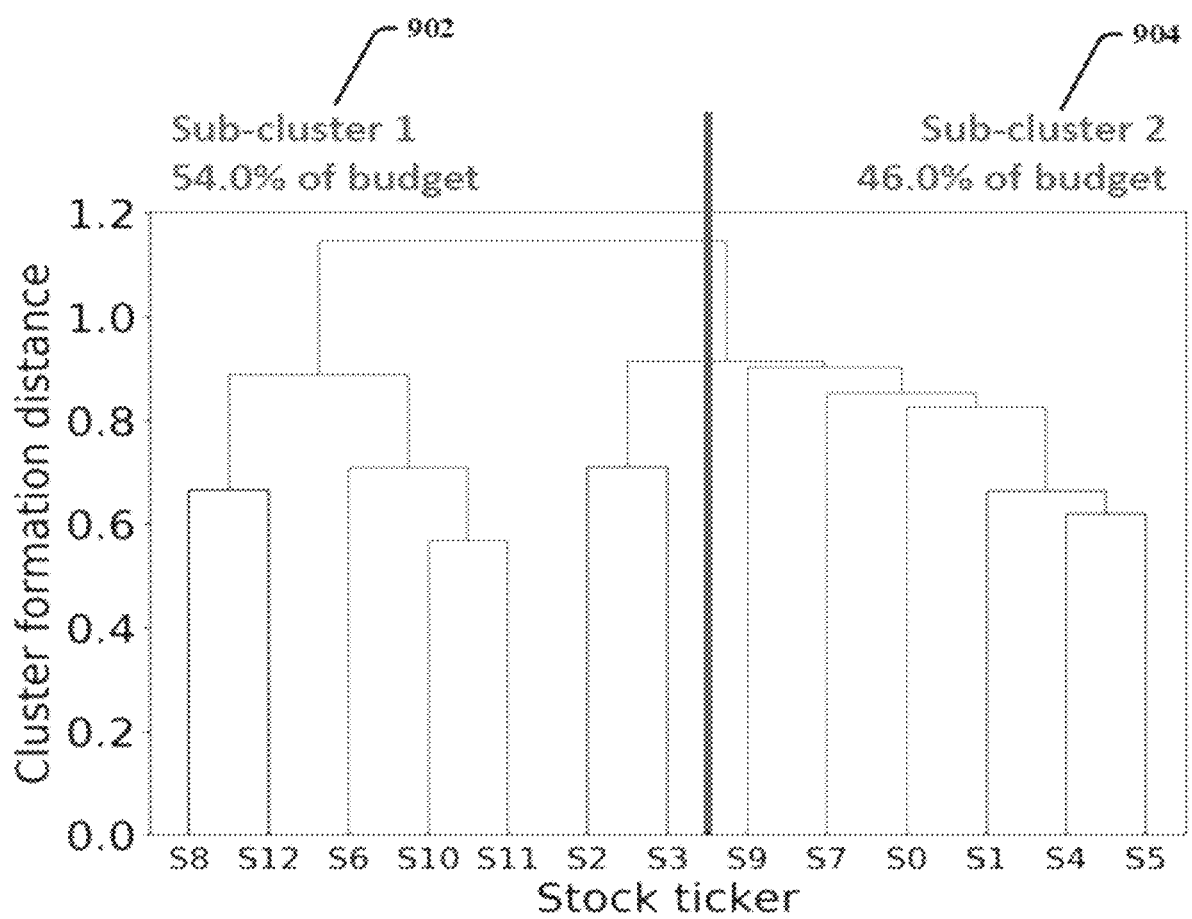
FIG. 9 illustrates an example of capital allocation using a method A by cluster bisection and fraction budget allocation.

FIG. 9 illustrates an example of method A, where there are 13 stocks S0 to S13. A single step bisection is performed to reduce the cluster size. This created sub-cluster 1 denoted as 902 and 2 denoted as 904. A fraction of the budget is assigned to sub-cluster 1 as 54.0% and 46.0% for sub-cluster 2. Based on the optimization results, best assets within the cluster can be purchased. To illustrate this method further, consider an investment universe of N=13 assets and a quantum computer with only seven qubits. For simplicity, it can be assumed that each asset can either be included or not be included in the portfolio. Thus, there are thirteen decision variables $x_i \in \{0, 1\}$ with i=1, ..., 13 and the task is:

$$\max_{x_i \in \{0,1\}} \sum_{i=1}^{N} \mu_i x_i - q \sum_{i,j=1}^{N} \sigma_{i,j} x_i x_j$$

$$\text{such that } \sum_{i=1}^{N} p_i x_i \leq B$$

Here, $p_i$ is the cost of asset i. The budget constraint mentioned in the equation above states that the total price paid for many of the assets may be smaller or equal to the budget B=5. This optimization problem is too large to fit in a NISQ computer. Therefore, the assets are clustered resulting in a dendrogram with two clusters $C_1$, $C_2$ with seven, six assets, respectively as shown in FIG. 9. If two clusters are small enough to be optimized together, and to avoid breaking the problem down into very small instances, said clusters can be considered as one cluster. A split factor $\alpha=0.55$ is calculated between $C_1$ and $C_2$ resulting in the two separate optimization problems:

$$\max_{x_i \in C_k} \sum_{i} \mu_i x_i - q \sum_{i,j} \sigma_{i,j} x_i x_j$$

$$\text{such that } \sum_{i} p_i x_i \leq B_k$$

with k=1, 2, $B_1 = \lceil \alpha B \rceil$, and $B_2 = \lfloor (1-\alpha)B \rfloor$. The split factor $\alpha$ where Vi is the number of assets in cluster i can also be represented as shown below:

$$\text{split factor:} \alpha = \frac{V_1}{V_1 + V_2}$$

$B_1$ is rounded differently from $B_2$ to ensure $B_1+B_2=B$. To solve the sub-problem mentioned in the above equation on NISQ computers, mapping is performed by:

$$\max_{\substack{x_i \in C_k \\ s_k < 0}} \sum_{i} \mu_i x_i - q \sum_{i,j} \Sigma_{i,j} x_i x_j - \lambda \left( \sum_{i} p_i x_i - B_k - s_k \right)$$

This allows to optimize the capital allocation in the two clusters using the VQE. When the quantum results are compared to a classical brute force search, it is noted that the classical method is not scalable to large portfolio instances.

Hence, various methods are chosen to perform classical allocation wherein a portfolio manager may elect to spread the capital evenly across many of the sub-clusters as well.

Figure 10:
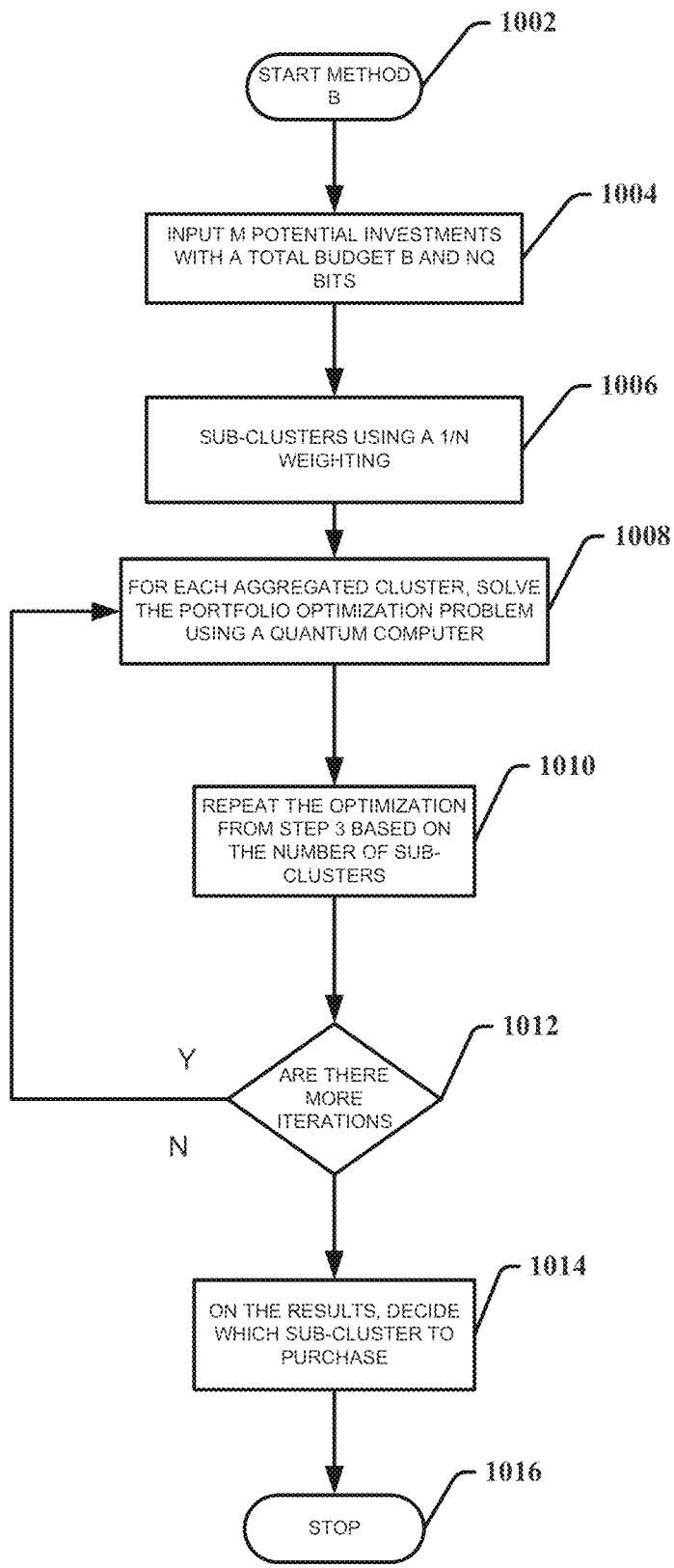
FIG. 10 illustrates a flow chart of a method B for capital allocation to sub-clusters.

FIG. 10 illustrates a flow chart for 1/N capital allocation to sub-cluster using method B. When this allocation process starts at 1002 with an input M potential investment, total budget B and $N_q$ bits denoted at 1004, the capital is allocated to the sub-clusters such that the amount of capital allocated to a sub-cluster is proportional to the number of assets in the sub-cluster as denoted at 1006. For each aggregated cluster at 1008, portfolio optimization problem is solved on the aggregated clusters using a gate-based Quantum computer. This process is repeated based on the number of clusters 1010. If there are more iterations at 1012 then act 1008 is repeated, else based on the optimized results best clusters are chosen to purchase at 1014 and this completes the process at 1016. This can be explained as the bottom up method where in the assets are considered as clusters and the problem is solved at cluster level and at the end of optimization the decision of purchase is made at cluster level. Apart from method A and method B mentioned in these embodiments, there are many other methods that can be utilized to perform this optimization based on the data sets and the problem that is being solved.

Figure 11:
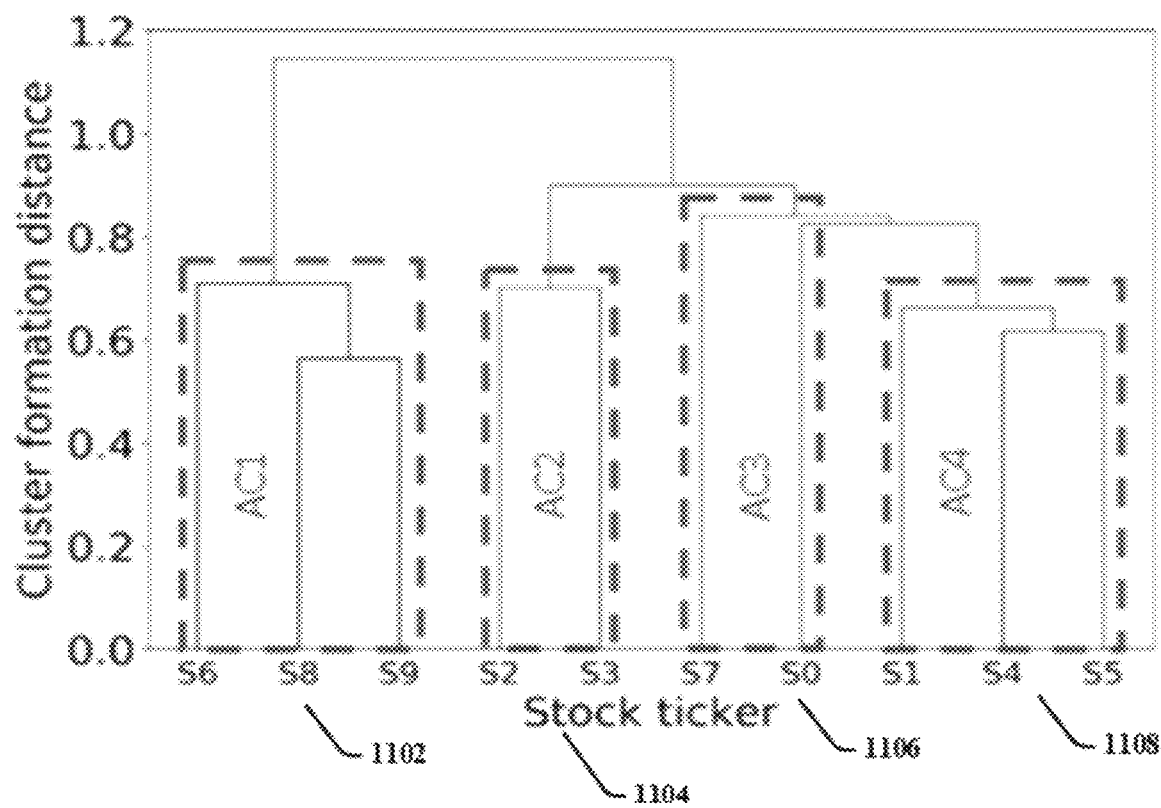
FIG. 11 illustrates an example of capital allocation using method B by aggregating sub-clusters.

FIG. 11 illustrates an example of method B capital allocation to sub-cluster. In this method, clustering is performed by aggregating sub-clusters using 1/N weighting. By aggregating the stocks S6, S8 and S9, the aggregated cluster AC1 denoted by 1102 is obtained. Similarly, aggregating the stock S2 and S3 the cluster AC2 denoted by 1104 is denoted. Aggregating S7 and S0 resulted with aggregated cluster AC3 denoted by 1106 and S1, S4 and S5 resulted with aggregated cluster AC4 denoted by 1108. If there are two assets that have similar behavior/performance in which if one asset goes up then the other asset goes up as well, then these two assets can be placed in the same cluster as the two assets co-relate themselves. From a portfolio optimization point of view, as a portfolio manager may not consider buying one or the other asset as both assets behave similarly and thus it does not change the portfolio behavior to a great extent. Upon clustering, the cluster can be considered as a new artificial asset. Each cluster is assigned a single price. Through this way, the portfolio manager can decide whether to invest in this cluster or not. If any of these clusters are decided to be invested in, then the whole cluster is purchased. Lastly, portfolio optimization is performed on a gate-based Quantum computer to decide which cluster to buy. For instance, if there are 50 qubits, 500 assets, 50 clusters and Budget 10 then optimization is performed on this at cluster level. This optimization problem can be solved in such a way that every qubit corresponds to 1 cluster and every cluster has a decision to make whether to buy it or not. Then the entire budget is spent to buy different clusters. Assuming many of the clusters have the same price, 2 clusters can be purchased and optimization can determine the best 2 clusters out of the 10.

To perform portfolio optimization with a hybrid quantum/classical algorithm on limited size Quantum computers, the optimization problem is decomposed into sub-problems. Upon forming the sub-clusters, capital allocation is performed by preserving budget constraints following multiple methods mentioned above. For each sub-cluster j, solve a discrete capital allocation problem which may take the form:

$$\min_{x_j \in \{0,1\}^{n_j}} q x_j^T \Sigma_j x_j - \mu_j^T x_j \text{ subject to } 1^T x_j = B_j$$

Where $x_j$ is the solution vector of cluster j and j identifies which cluster is being taken into consideration. Cluster j has $n_j$ assets so $x_j$ is a binary vector of $n_j$ elements. For every asset in the cluster, $x_j$ projects whether to buy the asset (1) or not to buy the asset (0). Then, to minimize the variance of the resulting portfolio minus the expected return and maximize the expected return minus the risk. This is weighed by q which is the risk factor. When q is 0 then the risk is neutral and the return is maximized. The larger the q value, the greater the emphasis is on the risk minimization. The $\Sigma_j$ is the covariance matrix of the assets in cluster j and is the expected return vector for the assets in cluster j. Thus, the first part of the equation mentioned above is the variance of the return of the portfolio. The larger the variance, the higher the risk of the cluster. This is subtracted with the portfolio expected return. The constraint to be noted here is to choose exactly $B_j$ assets in this vector $x_j$ such that $B_j$ assets equal to 1 and rest is 0. It is important to note that allocation to a single asset may be more than just a decision to be made between buying the asset versus not buying the asset. For $x_{j,i} \in \{0,1\}$, it determines whether to buy the asset or not for i of cluster j where there are 1 qubit/asset. Also, for $x_{j,i} \in \{0, 1\}^2$, max allocation to asset i of cluster j is $2^2-1=3$. Amount held of asset i is $\in \{0,1,2,3\}$ where there are 2 qubits/asset. In the capital allocation problem above, the assets can only be held in integer quantities (odd lots). This is a QUBO problem which is hard to solve. If the portfolio optimization problem is a QUBO problem and each asset is represented by one qubit with a Quantum processor of 5 qubits, then optimization on sub-clusters can only be done with 5 or less assets. The capital allocation problem may take on other forms, for instance, a continuous asset weights but with integer constraints. (e.g. invest in exactly 5 assets) is also a hard problem to solve. Hence, this form details the optimization formula for every cluster and budget is allocated upfront. The resulting smaller instances of the problem can be optimized on a Quantum computer such as a gate-based Quantum computer using various algorithms such as the VQE or QAOA as mentioned in the above sections. The VQE algorithm is a quantum/classical hybrid algorithm that can be used to find eigenvalues of a (often large) matrix. An eigenvalue is a set of values of a parameter for which a differential equation has a nonzero solution (an eigenfunction) under given conditions. This algorithm has been introduced as a hybrid quantum-classical algorithm for simulating quantum systems. Some examples of quantum simulation using VQE include solving the molecular electronic Schrödinger equation and model systems in condensed matter physics.

Figure 12:
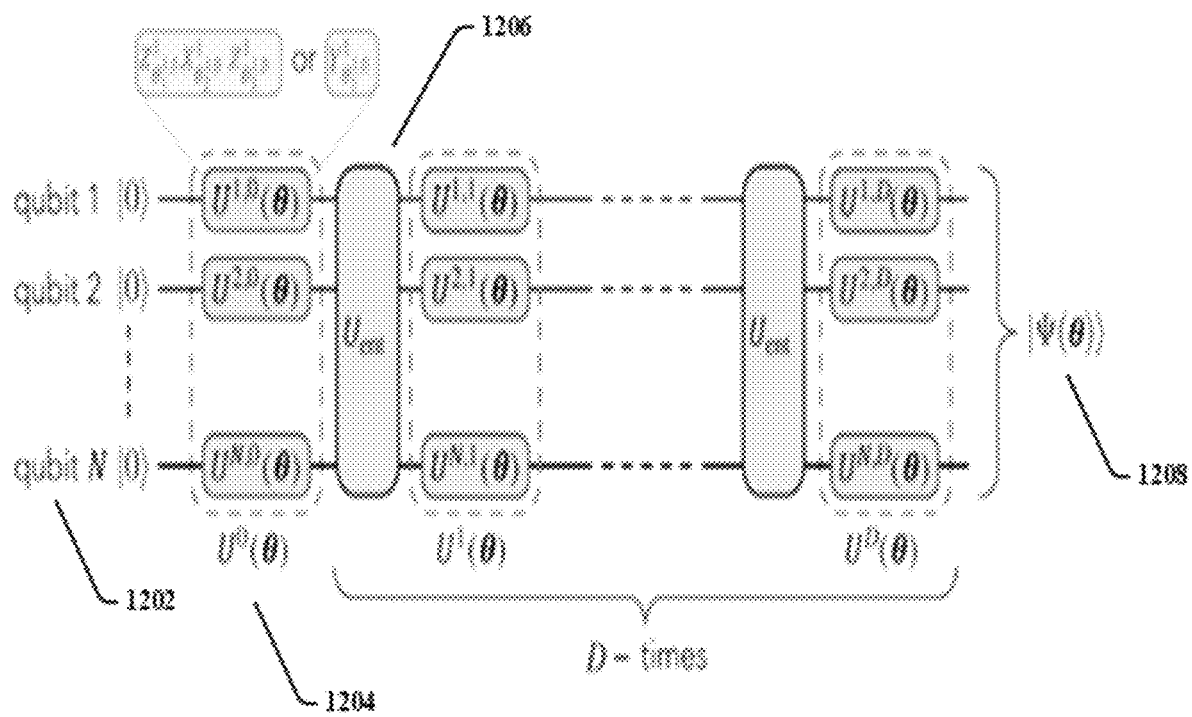
FIG. 12 illustrates a Quantum circuit for a VQE algorithm

FIG. 12 illustrates the Quantum circuit for the VQE algorithm. For N qubits denoted by 1202 and 1204 are parametrized single qubit cases. These cases change the state of each qubit and classical parameter is used. The blocks in 1206 are entangled to different qubits such that search can reach larger space. This algorithm is repeated D-times and the longer this process runs, the more parameters the system learns to optimize. At the end of the process, the qubit is measured and returns either a 0 or 1 which translates to whether the asset might be purchased or not. Every measurement gives a potential answer to the optimization problem. If a bit string is chosen to put it in the objective function, an objective value is returned. Once this algorithm runs D times with a fixed parameter such as theta in 1208, then optimization can be run to get the best result. Through this way the algorithm runs a binary optimization problem into a continuous optimization problem. The QAOA algorithm is a hybrid quantum-classical variational algorithm designed to tackle combinatorial optimization problems. This algorithm depends on a positive integer p and the approximation quality is improved asp is increased. The Quantum circuit that implements this algorithm consists of unitary gates and the depth of the circuit grows linearly with p times the number of constraints. If p is a fixed value, independent of the input size, then the algorithm uses the efficient method called the classical preprocessing. If p grows with the input size, a different strategy is proposed. These embodiments are not limited to VQE or QAOA algorithms. There are other suitable algorithms which can also be used for portfolio optimization depending on the optimization problem. Upon performing clustering, capital allocation and optimization, the portfolio return can be analyzed using the risk factor q mentioned above.

Figure 13:
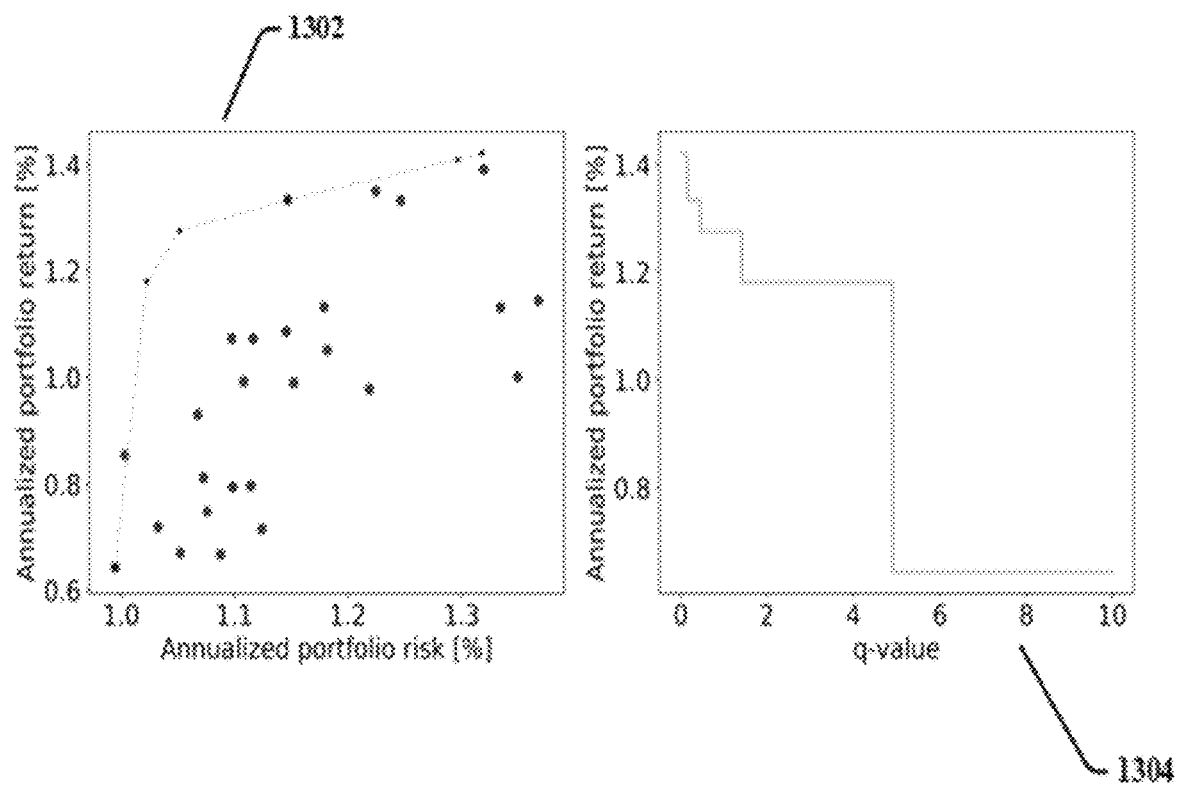
FIG. 13 illustrates an example annualized portfolio return for asset portfolios on a 5-qubit processor.

FIG. 13 illustrates the annualized portfolio return for the example mentioned above about 10 asset portfolios on a 5-qubit processor. The risk factor graph in 1302 represents an efficient frontier. The efficient frontier is a trade-off between risk and return wherein given a risk factor, a maximum return it produces. The efficient frontier is a basis for modern portfolio theory. The portfolios that fall below the efficient frontier are sub-optimal as these portfolios do not provide enough return for a level of risk. Portfolios that are to the right of the efficient frontiers are also sub-optimal as these portfolios have a higher risk level for a defined rate of return. The VQE optimizer was simulated and run several times and as shown by the large dots in 1302 for an equality budget constraint $B_1=2$ and $B2=3$ with prices pi=1 $\forall i$, the figure shows that as the q value increases the annualized portfolio return percent is decreasing as well. Hence, variable q controls a risk-return trade-off during optimization. A classical brute force search was done with many different q-values to benchmark the Quantum optimization. Moreover, this problem is discrete in nature and exhibits jumps in the solution as the q-value controlling the risk-return tradeoff is varied.

Figure 14:
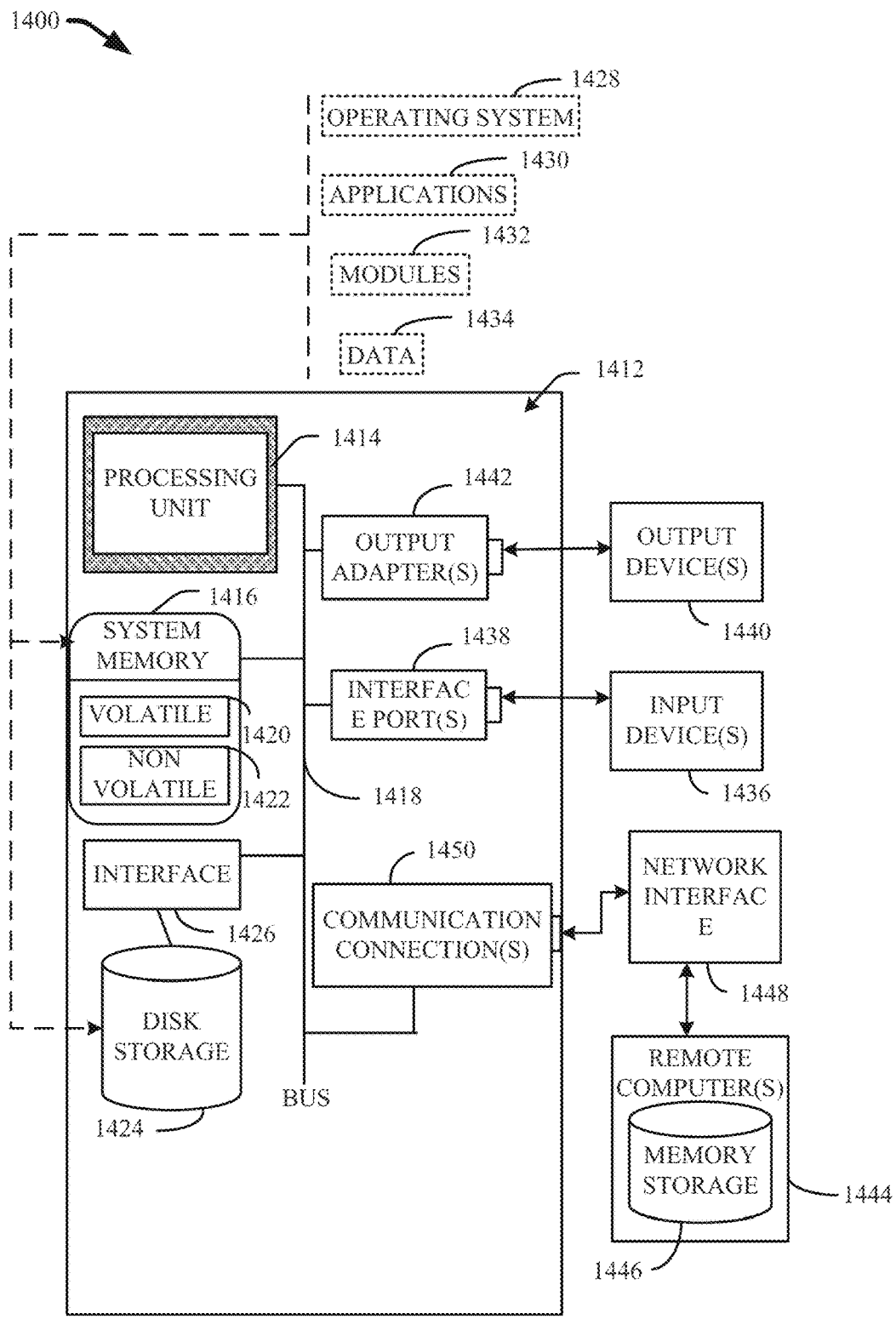
FIG. 14 illustrates a schematic diagram of an example operating environment in accordance with one or more implementations described herein.

FIG. 14 illustrates a suitable operating environment 1400 for implementing various aspects of this disclosure can also include a computer 1412. The computer 1412 can also include a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/non-volatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used, such as interface 1426. FIG. 14 also depicts software that acts as an intermediary between users and the basic computer resources described in the suitable operating environment 1400. Such software can also include, for example, an operating system 1428. Operating system 1428, which can be stored on disk storage 1424, acts to control and allocate resources of the computer 1412. System applications 1430 take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port can be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It can be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a computer, a server, a router, a network PC, a workstation, a microprocessor-based appliance, a peer device or other common network node and the like, and typically can also include many or all the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It can be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art can recognize that this disclosure also can or can be implemented in combination with other program modules. Generally, program modules include routines, programs, components, data structures, etc. that perform particular tasks and/or implement abstract data types. Moreover, those skilled in the art can appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not many aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings may generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a quantum processor that executes the following computer executable components:
a receiving component that receives from a classical computer a set of sub-clusters ($C_i$), of aggregated subsets of M number of assets of an investment universe where integer constraints are present or when assets can only be bought and sold in odd lots, wherein $C_i$ is equal to or below a threshold such that the sub-clusters are executable by the quantum processor;
a computing component that performs a binary/mixed-integer mean-variance optimization on each sub-cluster; and
a transmission component that transmits to the classical computer optimized solutions for asset allocation for respective sub-clusters ($C_i$).

2. The system of claim 1, where the quantum processor performs a binary/mixed-integer mean-variance optimization on each sub-cluster using a Variational Quantum Eigensolver (VQE) algorithm.

3. The system of claim 1, where the quantum processor performs a binary/mixed-integer mean-variance optimization on each sub-cluster using a Quantum Approximate Optimization Algorithm (QAOA) algorithm.

4. The system of claim 1, wherein the quantum processor for each sub-cluster solves a discrete capital allocation problem which takes the form:

$$\min_{x_j \in \{0,1\}^{n_j}} q x_j^T \Sigma_j x_j - \mu_j^T x_j \text{ subject to } 1^T x_j = B_j$$

$x_j$ solution vector of cluster $j$ $\Sigma_j$ covariance of cluster $j$ $q$ risk appetite $\mu_j$ return vector of cluster $j$.

5. The system of claim 1, wherein the computing component allocates capital to the sub-clusters by exploiting a quasi-diagonal clustered correlation matrix.

6. The system of claim 1, wherein the computing component employs a split factor:

$$\alpha_j = 1 - \frac{\sigma_{j,1}}{\sigma_{j,1} + \sigma_{j,2}}.$$

7. A computer-implemented method comprising:
using a quantum processor to execute computer executable components stored in memory to perform the following acts:
  using the quantum processor to receive from a classical computer a set of sub-clusters ($C_i$), of aggregated subsets of M number of assets of an investment universe where integer constraints are present or when assets can only be bought and sold in odd lots, wherein $C_i$ is equal to or below a threshold such that the sub-clusters are executable by the quantum processor;
  performing, using the quantum processor, a binary/mixed-integer mean-variance optimization on each sub-cluster; and
  transmitting, using the quantum processor, to the classical computer optimized solutions for asset allocation for respective sub-clusters ($C_i$).

8. The method of claim 7, further comprising performing, using the quantum processor, a binary/mixed-integer mean-variance optimization on each sub-cluster using a Variational Quantum Eigensolver (VQE) algorithm.

9. The method of claim 7, further comprising performing, using the quantum processor, a binary/mixed-integer mean-variance optimization on each sub-cluster using a Quantum Approximate Optimization Algorithm (QAOA) algorithm.

10. The method of claim 7, further comprising solving for each sub-cluster, using the quantum processor, a discrete capital allocation problem which takes the form:

$$\min_{x_j \in \{0,1\}^{n_j}} q x_j^T \Sigma_j x_j - \mu_j^T x_j \text{ subject to } 1^T x_j = B_j$$

$x_j$ solution vector of cluster $j$ $\Sigma_j$ covariance of cluster $j$ $q$ risk appetite $\mu_j$ return vector of cluster $j$.

11. The method of claim 7, further comprising allocating, using the quantum processor, capital to the sub-clusters by exploiting a quasi-diagonal clustered correlation matrix.

12. The method of claim 7, further comprising using the quantum processor to employ a split factor:

$$\alpha_j = 1 - \frac{\sigma_{j,1}}{\sigma_{j,1} + \sigma_{j,2}}.$$

13. A computer program product facilitating asset allocation, the computer program product comprising a non-transitory computer readable storage medium having program instructions embodied therewith, the program instructions executable by a quantum processor to cause the quantum processor to:
  receive, using the quantum processor, from a classical computer a set of sub-clusters ($C_i$), of aggregated subsets of M number of assets of an investment universe where integer constraints are present or when assets can only be bought and sold in odd lots, wherein $C_i$ is equal to or below a threshold such that the sub-clusters are executable by the quantum processor;
  perform, using the quantum processor, a binary/mixed-integer mean-variance optimization on each sub-cluster; and
  transmit, using the quantum processor, to the classical computer optimized solutions for asset allocation for respective sub-clusters ($C_i$).

14. The computer program product of claim 13, wherein the program instructions are further executable by the quantum processor to cause the quantum processor to: perform, using the quantum processor, a binary/mixed-integer mean-variance optimization on each sub-cluster using a Variational Quantum Eigensolver (VQE) algorithm.

15. The computer program product of claim 13, wherein the program instructions are further executable by the quantum processor to cause the quantum processor to: perform, using the quantum processor, a binary/mixed-integer mean-variance optimization on each sub-cluster using a Quantum Approximate Optimization Algorithm (QAOA) algorithm.

16. The computer program product of claim 13, wherein the program instructions are further executable by the quantum processor to cause the quantum processor to: solve, using the quantum processor, for each sub-cluster, a discrete capital allocation problem which takes the form:

$$\min_{x_j \in \{0,1\}^{n_j}} q x_j^T \Sigma_j x_j - \mu_j^T x_j \text{ subject to } 1^T x_j = B_j$$

$x_j$ solution vector of cluster $j$ $\Sigma_j$ covariance of cluster $j$ $q$ risk appetite $\mu_j$ return vector of cluster $j$.

17. The computer program product of claim 13, wherein the program instructions are further executable by the quantum processor to cause the quantum processor to: allocate, using the quantum processor, capital to the sub-clusters by exploiting a quasi-diagonal clustered correlation matrix.

18. The computer program product of claim 13, wherein the program instructions are further executable by the quantum processor to cause the quantum processor to employ a split factor:

$$\alpha_j = 1 - \frac{\sigma_{j,1}}{\sigma_{j,1} + \sigma_{j,2}}.$$

* * * * *